United States Patent [19]

Medlin

[11] 4,352,316
[45] Oct. 5, 1982

[54] LIGHTWEIGHT ARMORED VEHICLE AND METHOD OF MAKING SAME USING WOVEN POLYESTER GLASS PROTECTIVE SHEETS

[76] Inventor: Richard C. Medlin, 2562 Stirling Rd., Hollywood, Fla. 33021

[21] Appl. No.: 220,134

[22] Filed: Dec. 24, 1980

Related U.S. Application Data

[63] Continuation-in-part of Ser. No. 920,715, Jun. 30, 1978, Pat. No. 4,316,404.

[51] Int. Cl.³ .............................................. F41H 5/04
[52] U.S. Cl. .................................... 89/36 A; 428/257; 428/911
[58] Field of Search .................. 2/2.5; 89/36 R, 36 A; 109/80, 82, 83, 84; 428/911, 257

[56] References Cited

U.S. PATENT DOCUMENTS

| | | | |
|---|---|---|---|
| 2,562,951 | 8/1951 | Rose et al. | 2/2.5 |
| 2,697,054 | 12/1954 | Dietz et al. | 89/36 A |
| 2,758,952 | 8/1956 | Toulmin, Jr. | 89/36 A |
| 3,832,266 | 8/1974 | Archibald | 2/2.5 |
| 3,855,898 | 7/1981 | McDonald | 89/36 H |
| 4,090,005 | 5/1978 | Morgan | 428/911 |

*Primary Examiner*—Stephen C. Bentley
*Attorney, Agent, or Firm*—Gunn, Lee & Jackson

[57] ABSTRACT

A lightweight armored vehicle and method of making the same is shown. The interior of a standard automobile to be equipped with lightweight armor is first stripped of its interior furnishings. Doors and window frames are rebuilt to rigidly mount a bulletproof transparent window therein. The passenger compartment is bulletproofed by placing lightweight woven polyester glass sheets about it to form a continuous protective layer. Where appropriate the sheets are rigidly formed with a resin-catalyst mixture. Additional bullet resistant strength may be provided by multiple layers of ballistic nylon, aromatic polyamide material, or by similar such materials woven together into composite units.

17 Claims, 18 Drawing Figures

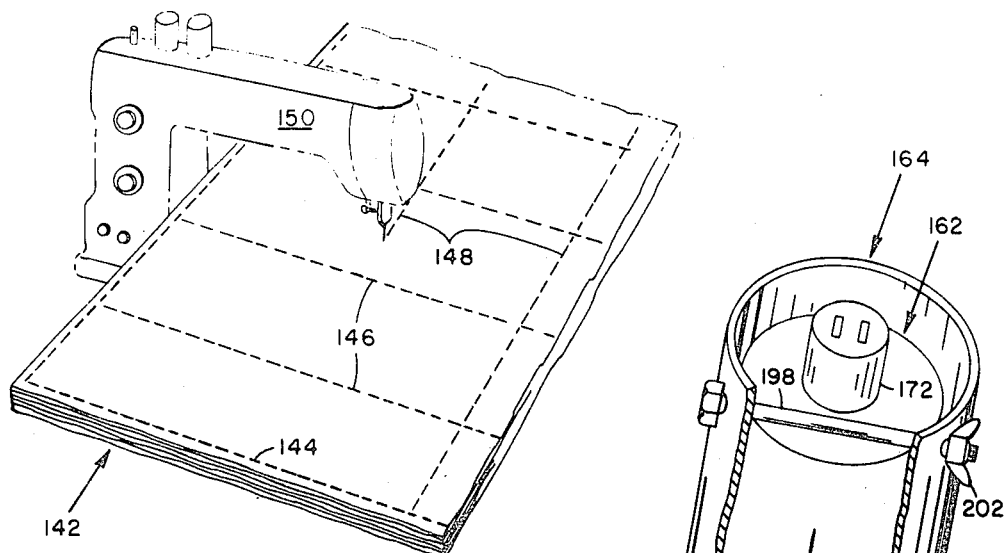
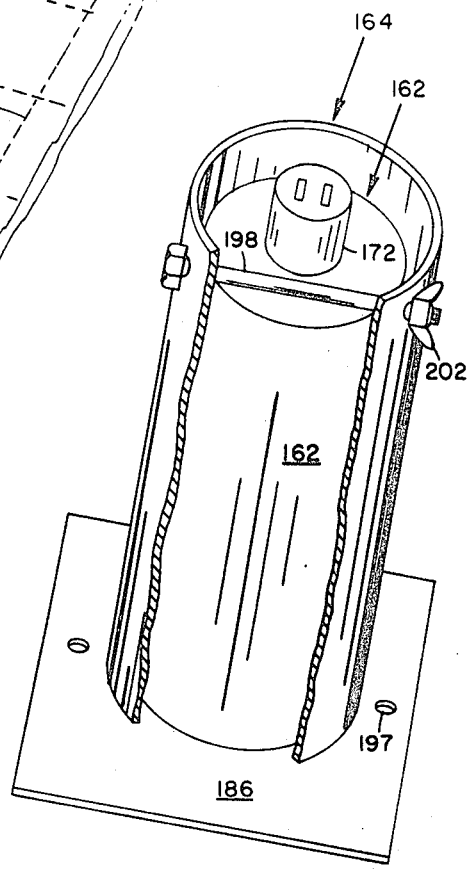
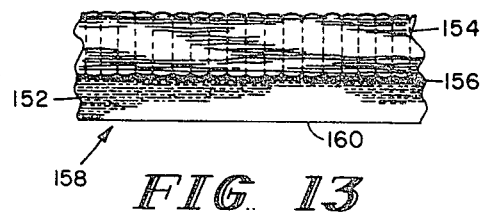
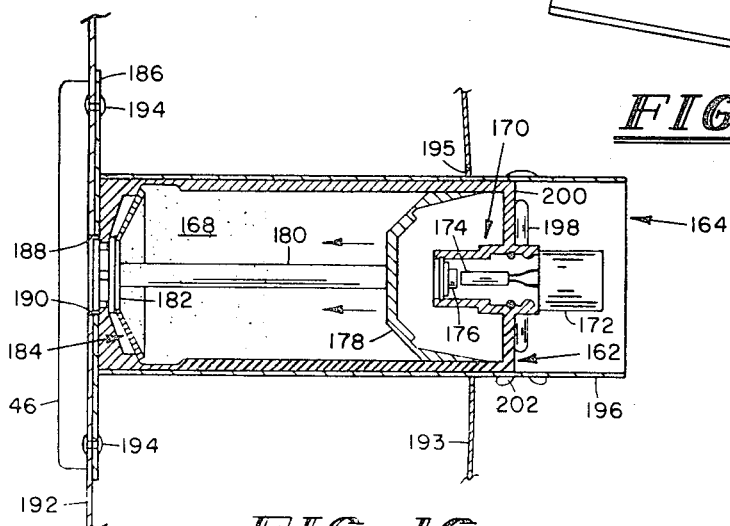

LIGHTWEIGHT ARMORED VEHICLE AND METHOD OF MAKING SAME USING WOVEN POLYESTER GLASS PROTECTIVE SHEETS

BACKGROUND OF THE INVENTION

This application is a continuation-in-part of U.S. patent application Ser. No. 920,715 filed June 30, 1978, now U.S. Pat. No. 4,316,404, having the same inventor, which is hereby incorporated by reference.

This invention relates to armored vehicles and, more particularly, to either a method of retrofitting a standard automobile to make it a lightweight armored vehicle or building a new lightweight armored vehicle. The passenger compartment is encapsulated in bulletproof windows, woven polyester glass protective sheets some of which are embodied in an epoxy resin, and ballistic nylon or aromatic polyamide material to prevent penetration by projectiles normally used in case of attack.

BRIEF DESCRIPTION OF THE PRIOR ART

Prior to the present invention, modifying a standard automobile to give it armor protection involved retrofitting the automobile with one-quarter inch tungsten steel plate armor, securing inside of the automoblie a layer of bullet resistant polycarbon laminate inside of the side windows, and installing a bulletproof front and rear window. Such a procedure increased the weight of the automobile by approximately 2800 pounds. The increased weight made the automobile difficult to handle, plus placed excess strain on the drive train thereby requiring the installation of a heavy duty transmission, rear axle drive unit and suspension system. The bolting of the bullet resistant polycarbon laminate inside of the side windows of the automobile detracted from its normal appearance, plus revealed to would-be terrorists or kidnappers that the automobile was armored. One of the most desirable features of the present armored vehicle is that it appears to be an ordinary vehicle thereby not attracting attention of the public.

While the manufacturers of luxury automobiles have in the past offered armored vehicles as standard equipment, a luxury automobile itself attracts considerable attention that would not be caused by a smaller type vehicle. Further, the luxury vehicles have the attendant disadvantage of increased weight due to tungsten steel plating contained therein, and the resultant lack of maneuverability. Even the luxury automobiles do not have the many features of the present automobile, plus the reduced weight.

SUMMARY OF THE INVENTION

It is an object of the present invention to provide a lightweight armored type vehicle.

It is another object of the present invention to retrofit a standard automobile with lightweight bulletproof armor and still maintain an outward appearance of a standard automobile.

It is another object of the invention to provide a lightweight protective plate.

A standard automobile is first stripped of its interior. Next, the window mechanisms are removed and a support system installed in the doors for supporting a Lexgard laminate and safety plate glass in a rigid closed position. The door frames are rebuilt to receive and seal with the newly formed side windows. The frames are also filled with bullet resistant material. The front and rear window frames are rebuilt to receive a bulletproof window therein comprising a bullet resistant glass and polycarbon laminate. The external appearance of the automobile remains essentially unchanged with the body being rebuilt to receive thicker window frames.

Vertical portions of the automobile, including the doors, side walls, fire wall and rear seat area, are retrofitted with a woven polyester-glass protective layer rigidly formed with a resin-catalyst mixture. Additional bullet resistant strength is provided by multiple layers of ballistic nylon or aromatic polyamide attached to the woven polyester glass protective layer. Flat areas of the automobile, such as the top or bottom (which are not normally subject to perpendicular penetration by bullets or other projectiles during an attack) are equipped with multiple layers of ballistic nylon to prevent the reflection of projectiles therethrough. The ballistic nylon or aromatic polyamide material is secured in position by a silicone sealant. Any possible paths of entry of a projectile into the protective area of the passenger compartment of the automobile are protected by the woven polyester glass protective layer and/or the ballistic nylon to the degree necessary to withstand normal attacks.

To prevent possible explosion, the fuel tank is wrapped in ballistic nylon and the battery is encased in a woven polyester glass protective layer structure. To prevent deterioration to aromatic polyamide material as may be caused by moisture, the aromatic polyamide material is encapsulated in an impermeable material, such as a layer of plastic, to prevent moisture contact therewith. The aromatic polyamide material, which is sewn together in multiple layers, is rigidly attached to the woven polyester glass protective layer by a suitable bonding material, such as silicone construction sealant 1400 manufactured by General Electric Company. The stitching of the ballistic nylon or aromatic polyamide material prevents separation of the layers in the event of penetration by a projectile. If bullets are fired into the side of the door, the layers of woven polyester glass protective layer will flatten and/or disperse the projectile over a larger area with the interior multiple layers of aromatic polyamide material catching any remaining fragments from the projectiles. Consequently, none of the projectiles will enter the protected area of the passenger compartment. The safety plate glass gives additional strength to the side windows when used in combination with the polycarbon laminate.

The front and rear windows are manufactured by Pittsburg Plate Glass Company and include an inner $\frac{1}{4}$ inch layer of bullet resistant polycarbon laminate and an outer $\frac{3}{4}$ inch layer of bullet resistant glass. Lexgard is a transparent bullet resistant sheet manufactured by General Electric Company. The ballistic nylon is manufactured by the Amerbelle Corporation in Rockville, Conneticut. Aromatic polyamide material, which is much more expensive than ballistic nylon but has higher bullet resistant strength, is manufactured by J. P. Stevens Company. Aromatic polyamide material will deteriorate if subjected to moisture, as will the ballistic nylon, but not as rapidly. Therefore, it must be protected against moisture. The woven polyester glass sheets preferably used are manufactured by Proforma, Inc., Seguin, Tex. and is 24 ounce, 4×4 weave of woven roven polyester glass filament with a starch oil sizing; however, others could be used provided they give the strength desired. A resin-catalyst presently being used to form the rigid woven polyester glass planel is methyl ethyl ketone peroxide in dimethyl phthalate sold under the same Cadox M-105 by Noury Chemical Corporation in Burt, New York; however, other resins could be used.

BRIEF DESCRIPTION OF THE DRAWINGS

FIG. 13 is a cross-sectional view of the aromatic polyamide material as attached to the rigidly formed polyester glass protective layer.

FIG. 14 is a partial perspective view illustrating the formation of multi-layer aromatic polyamide material or ballistic nylon.

FIG. 15 is a perspective view of a tear gas cannister installation system with a portion sectionalized.

FIG. 16 is a sectional view along the longitudinal axis of the tear gas cannister shown in FIG. 15.

DESCRIPTION OF THE PREFERRED EMBODIMENT

Figure 1:
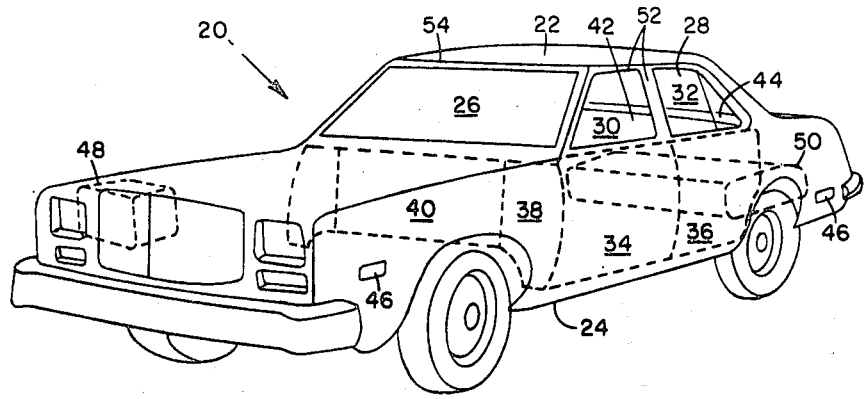
FIG. 1 is a perspective view of a standard automobile retrofitted with lightweight armor.

The particular improvement which is most noteable in this continuation-in-part application over the parent application concerns the manufacture and use of a new type of lightweight armored plate. The plate is comprised of multiple sheets woven with polyester and glass filaments, which sheets are sized (glazed) with a starch oil sizing and subsequently laminated together with a non-wax resin-catalyst mixture to produce a rigid woven polyester glass armored plate.

The theory involved in the design and construction of the rigid woven polyester glass protective layer concerns the field of terminal ballistics. The basic objective in designing armor within the weight constraints necessarily adopted in building lightweight armored vehicles capable of withstanding a single attack is to provide armor which absorbs as much kinetic energy as possible from the impacting high speed projectile while failing.

Steel plate armor, such as is used in military tanks, operates in a non-failure mode. The imparting projectile is prevented from penetrating the tank's armor. The steel plate armor does not fail but rather succeeds in deflecting the projectile or halting the projectile without causing significant permanent damage to the armor itself.

Armor which succeeds in repelling high velocity projectiles without significant damage to the armor is too heavy to be used in producing lightweight vehicles of the type described above. It is necessary, therefore, to use lighter armor which fails to deflect the projectile but which, while failing, absorbs enough of the projectile's kinetic energy to render it harmless to occupants of the protected passenger compartment.

The theory of terminal ballistics is based primarily upon the equation $$F \times D = W$$

where "F" represents force, "D" represents distance and "W" represents work. Since the work to be preformed by armor operating in the failure mode is to completely absorb the kinetic energy of forward motion of the impacting high velocity projectile $$W = KE \text{ projectile}$$

where "KE projectile" represents the kinetic energy of forward motion of the projectile.

It can thus be seen that to protect passengers relying upon failure mode armor, the amount of force needed to deform the armor and the amount of deformation (distance) must be maximized to give $$KE \text{ projectile} - (F \times D) = 0$$

The structure of the invented lightweight armor described herein is designed and constructed to cause maximum deformation of both the armor itself and of the projectile while requiring the maximum amount of force to do so.

After much research and testing, it was discovered that, within the available weight parameters, the most effective means of absorbing the kinetic energy of forward motion of the projectile was to allow the projectile to deform, separate, and penetrate a number of separate armored sheets. Because of weight limitations a woven sheet is used as the armored sheet. Furthermore, both the armored or ballistic sheets and the protective layer as a whole are more effective and are more conveniently used if the separate sheets contain both hard filaments to dissipate the kinetic energy of the projectile by deforming it and filaments of high tensile strength to dissipate the kinetic energy of the projectile by causing the sheet to deform prior to penetration.

The parent application hereto shows an outer rigid woven polyglass sheet upon which is bonded an inner layer of multi-layer ballistic cloth. One of the improvements of the invented protective layer is in eliminating the need for a separate inner layer of ballistic cloth. The function previously served by the inner layer of cloth is, in the instant invention, preformed by the fibers of high tensile strength woven into the outer rigid protective layer. A synergistic effect is created, however, when the high tensile strength fibers are woven into the rigid protective layer. Not only do they continue to serve the function of catching spent fragments but also serve to make the individual woven sheets somewhat more flexible or deformable and thus more fracture resistant. As will be shown below, the ability of the individual sheets of the disclosed protective layer to require deformation prior to penetration is an essential element of the disclosed protective layer.

The strands of the sheet are comprised of polyester and glass filaments. The polyester filaments provide the sheet with a high degree of tensile strength. The glass filaments provide rigidity and projectile splitting ability. In combination, the polyester and glass filaments provide polyester glass strands and sheets which are effective in dissipating projectile kinetic energy by splitting the projectile to spread it out over a larger area of the sheet by bending upon impact to absorb more projectile kinetic energy than would be absorbed if the sheet fractured. Twenty-four ounce, 4×4 weave of woven roven polyester glass strand sheet wherein the strands are comprised of approximately 18 to 28 filaments per strand has been found to be the most desirable construction for the sheets.

The sheets themselves are sized with a starch oil sizing. They are then layered and laminated together with a nonwax resin-catalyst mixture. The starch oil sizing and nonwax resin-catalyst mixture is chosen because of the chemical incompatability and resultant nonadherence or low adherence between the two. The starch oil sizing and nonwax resin-catalyst mixture thus imperfectly bond with each other by which expression it is meant they adhere to each other less well than the resin-catalyst mixture would adhere to the unsized ballistic sheet. This property is important because it allows the sheets to be laminated together into a single rigid armor plate in which the sheets delaminate upon being penetrated by a high velocity projectile. The term "delamination" refers to the separating of the previously bonded ballistic sheets at and near the point of impact of the projectile. The delamination occurs due to the deliberately created imperfect lamination or bonding between sheets as is described elsewhere herein.

The rigidness of the armored plate as a whole is useful to initially dissipate much of the projectile's kinetic energy at the surface of the plate by transferring it to the armored plate as a whole. As the projectile begins to push upon each individual sheet, however, that sheet will deform as it fails to halt the projectile and will delaminate from the adjacent sheets. The delamination permits the individual sheet to flexibly deform to accommodate the incoming projectile rather than being inflexibly penetrated by it. This is an energy consuming process and serves to further dissipate the projectile's kinetic energy.

Upon impacting upon the armor plate as a whole, which is rigid due to the resin-catalyst mixture; deforming several individual sheets which are strong and flexible due to the polyester fibers; splitting upon the glass filaments; delaminating the several individual sheets due to the imperfect adherance between the starch oil sizing and the nonwax resin; and penetrating the several armored sheets; the kinetic energy of the projectile is either completely dissipated or is sufficiently dissipated as to render it harmless.

The term "ballistic" as used as an adjective herein denotes that the article modified resists penetration by high velocity projectiles.

The automobile represented generally by reference numeral 20 as shown in FIG. 1 appears to be a standard size American automobile somewhere below the luxury line of vehicles. However, automobile 20 has been retrofitted to be an armored vehicle. For example, the top 22 has installed in the headliner a 24-ply ballistic nylon, as well as the floor panel 24. The windshield 26 and the rear window 28 have special built frames that receive bullet-proof glass and bullet-resistant polycarbon laminate therein. The front and rear door windows 30 and 32, respectively, have been replaced with safety plate glass and a bullet-resistant polycarbon laminate.

Installed inside of the front and rear doors is a lightweight woven polyester glass protective layer rigidly formed with a resin-catalyst mixture to produce a rigid woven polyester glass protective panel. The side kick panels contain a rigid woven polyester glass protective panel in combination with a 24-ply ballistic nylon. The back panel 42 and package tray 44 are reinforced with 18-ply rigidly formed fiberglass. If additional bullet-resistant strength is felt to be necessary, multi-layers of aromatic polyamide material may be included therein. A tear gas dispersal system is contained behind reflectors 46. To provide additional or less strength, either more or less layers of ballistic nylon, aromatic polyamide material or woven polyester glass may be used.

To still supply electrical power to the vehicle in case the engine is disabled, dual batteries are provided, which batteries are housed in an 18-ply rigidly formed fiberglass battery box 48. To prevent explosion of the gas tank 50, the gas tank 50 is wrapped in a 30-ply ballistic nylon. The door frames 52 are built to receive the rear and front door windows 32 and 30 therein as will be explained in more detail subsequently. Front and rear window frames 54 extend outward from the automobile 20 to receive the new windshield 26 and rear window 28 with the body portion of the automobile 20 being reformed, contoured and painted.

Figure 2:
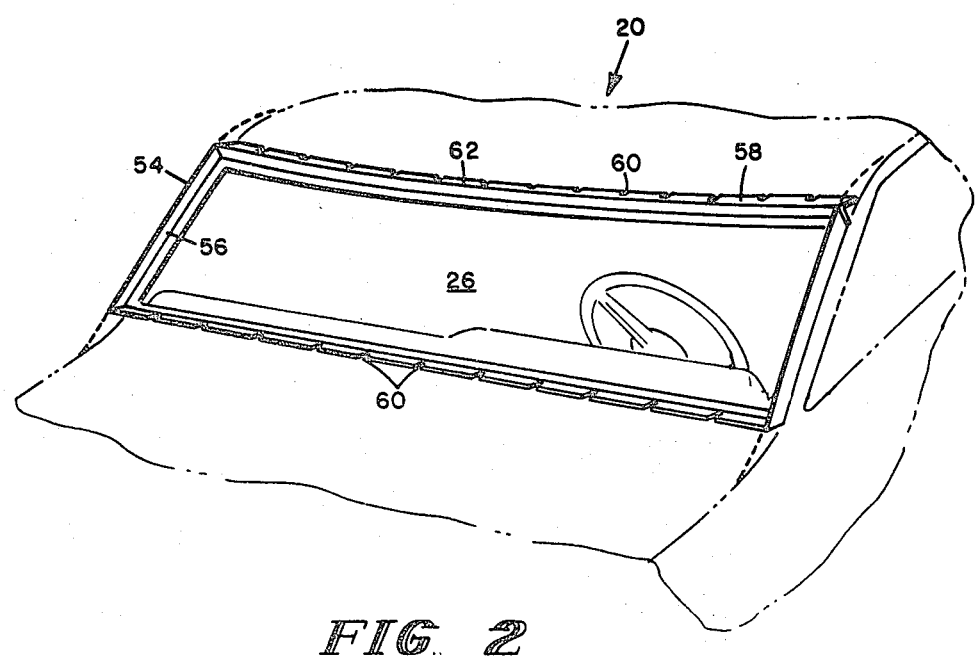
FIG. 2 is a perspective view of a new frame for a windshield to receive a bulletproof window therein with an automobile being shown in reference lines.
Figure 5:
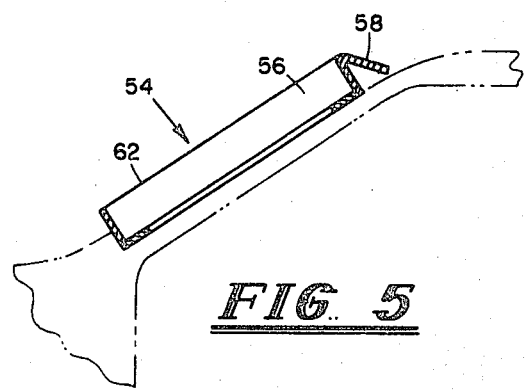
FIG. 5 is a partial sectional perspective view of the frame shown in FIG. 2 for front and rear windows.

Referring now to FIG. 2 of the drawings, the front and rear window frames 54 are shown in a perspective view with the car 20 being shown in reference lines. The new contour of the automobile adjacent to the window frame 54 is shown in dotted lines. The window frame 54 is formed from an angle iron having an acute angle (see FIG. 5). The window abutting portion 56 of the window frame 54 extends basically perpendicular to the outer surface of the windshield 26 and in a contiguous parallel relationship to the edges of the windshield 26. It is necessary to extend the depth of the frame normally holding the windshield 26 therein due to the increased thickness of the new windshield formed from safety plate glass and a polycarbon laminate. The outer support portion 58 of the window frame 54 is notched by cuts 60 extending from the outer edge to a close proximity with the window abutting portion. The notches provided by cuts 60 allow for bending to form the window frames 54. After the window frames have been formed, the cuts 60 are welded to provide a secure window frame 54. The entire window frame 54 is then welded to the body of the automobile 20. Rough surfaces that may interfere with the insertion of the windshield 26 or rebuilding of the body of the automobile 20 are then reformed by any conventional means, such as body putty, to extend to the outer edge 62 of the window frame 54. The new contour of the body of the automobile 20 is represented by dotted lines in FIG. 2.

Figure 3:
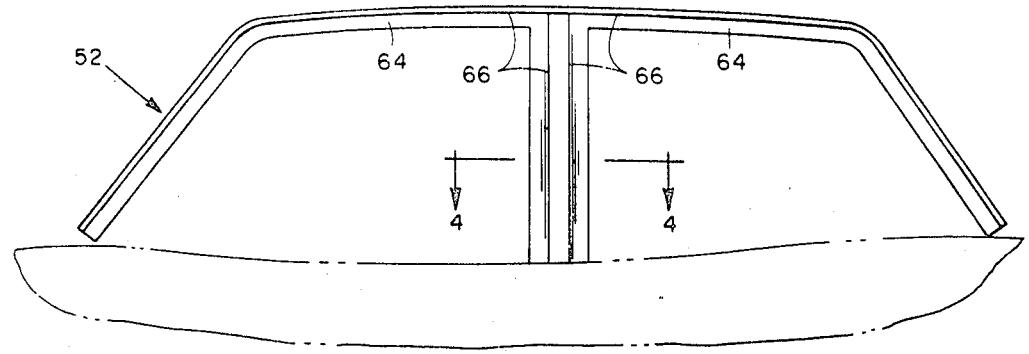
FIG. 3 is an elevated side view of a new door frame to receive a bulletproof window therein.
Figure 4:
FIG. 4 is a cross-sectional view of FIG. 3 along section lines 4—4.

Referring now to FIGS. 3 and 4 in combination, the door frames 52 as previously shown in FIG. 1 will be explained in more detail. Assume that the front and rear door windows 30 and 32 have not been installed. The door frame 52 has a flat vertical interior surface 64 against which windows 30 and 32 seal. The outwardly extending surfaces 66 are parallel to and contiguous with the edges of the windows 30 and 32. The center post portion of the door frame 52 is filled with a lightweight bullet-resistant material 68, such as multi-layers of aromatic polyamide material.

Figure 6:
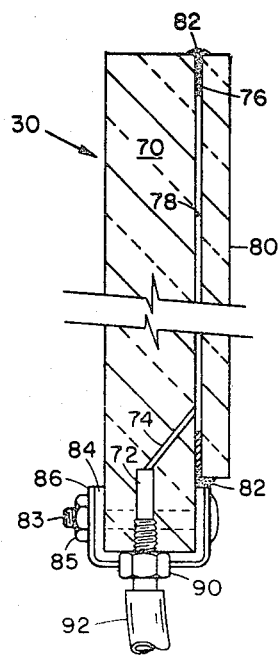
FIG. 6 is an elevated sectional view of a typical side window of the retrofitted armored vehicle shown in FIG. 1.
Figure 7:
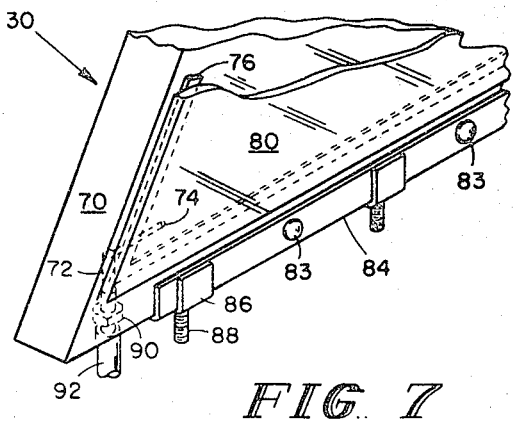
FIG. 7 is a typical partial perspective view of a lower front corner of a front side window of the vehicle shown in FIG. 1.

Referring to FIGS. 6 and 7 of the drawings in combination, the structure of the front door window 30, which is generally the same as all side windows, is shown in more detail. First, a polycarbon laminate 70 is cut to the general shape of the space provided for the window in door frames 52. The polycarbon laminate 70 is typically sold under the name Lexgard. The polycarbon laminate 70 has a threaded hole 72 formed in the lower edge thereof with a slanted hole 74 connecting the threaded hole 72 with the outer surface of the polycarbon laminate 70. A double-sided tape 76 is applied to the outer surface 78 of the polycarbon laminate 70 around the periphery thereof. A safety plate glass 80 having the same general flat dimensions as the polycarbon laminate 70, except it does not extend downwardly as far, is attached to the opposite side of the double-sided tape 76 which is approximately 1/16 of an inch thick. Next, the outer edge between the polycarbon laminate 70 and the safety plate glass 80 is sealed with a silicone-type sealant 82.

The lowermost portion of the polycarbon laminate 70 is fitted inside of a channel 84 as shown in FIGS. 6 and 7. The channel 84 may be attached to the polycarbon laminate 70 by any suitable means, such as cross bolts 83 and nuts 85. A mounting bracket 86 having a rigidly secured mounting bolt 88 therein is attached to the channel 84 by any suitable means, such as welding. The mounting bolts 88 extend downwardly from respective mounting brackets 86 on the channel 84.

After the window 30 is formed as shown in FIGS. 6 and 7, it is allowed to set for 24 hours. The space between the polycarbon laminate 70 and the safety plate glass 80 is filled with a low pressure nitrogen via valve fitting 90. The valve fitting 90 is connected via a tube 92 to a low pressure nitrogen container (not shown), which would normally be inserted inside of the door panel. The purpose of the nitrogen is to act as a drying agent to prevent clouding between the polycarbon laminate 70 and the safety plate glass 80. Also, the space therebetween is necessary to provide for the different rates of expansion between the polycarbon laminate 70 and the safety plate glass 80. In this preferred embodiment, the safety plate glass 80 would typically be ¼ of an inch thick, and the polycarbon laminate 70 approximately 1¼ inches thick.

Figure 8:
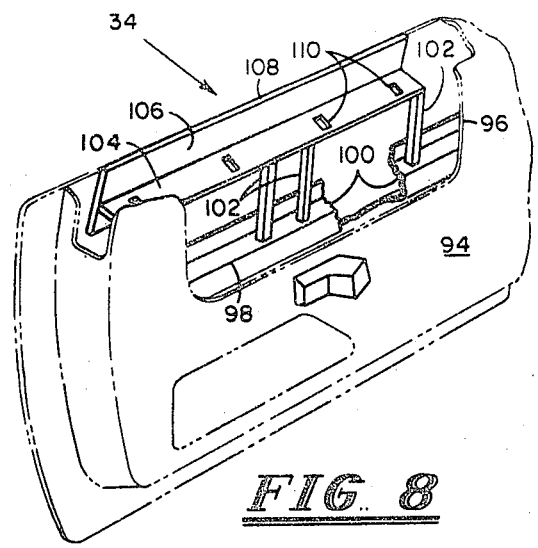
FIG. 8 is an inside perspective view of a door for the automobile shown in FIG. 1 after stripping the interior, removing the window mechanisms, and installing supports for a new bulletproof window.
Figure 9:
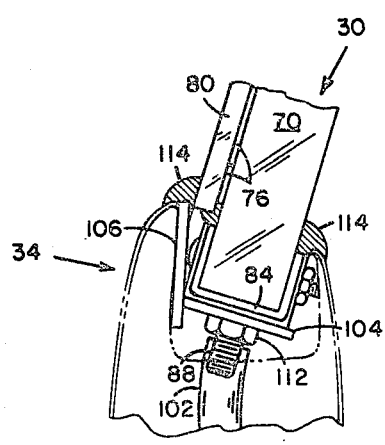
FIG. 9 is a partial elevated sectional view of FIG. 8 after installation of the bulletproof window.

Referring to FIGS. 8 and 9 in combination, the first step in retrofitting automobile 20 for armor is to strip the interior from the automobile. In the doors, such as front door 34 shown in FIG. 8, the window mechanism is removed and an upper portion of the internal wall 94 of the door 34 is cut away as shown by opening 96. A cross brace 98 is normally contained inside of the door of most automobiles. However, in the model shown in FIG. 8, the cross brace 98 has a considerable width therefore a portion of the cross brace 98 is cut out as shown by reference numeral 100 to allow room for a gun port as will be subsequently explained in more detail.

Extending upward from cross brace 98 are window support posts 102 that connect to the cross brace 98 by any suitable means, such as welding. The upper portion of the window support post 102 connects to an elongated plate 104 inside of front door 34, which elongated plate 104 is mounted at a slight incline as shown in FIG. 9. The elongated plate 104 is rigidly attached to a vertical side plate 106 that extends to the top 108 of the door 34.

The front door window 30 as shown in FIGS. 6 and 7 is secured in position by inserting the mounting bolts 88 inside of slots 110 provided in elongated plate 104 shown in FIGS. 8 and 9. Nuts 112 threadably connected to mounting bolts 88 secure the window 30 in position. Molding 114 is positioned around the edges of the window 30 in the conventional manner.

Figure 10:
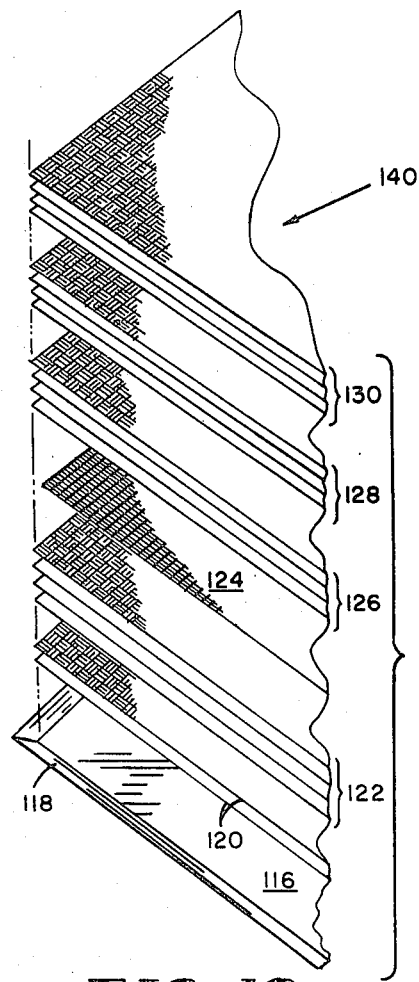
FIG. 10 is an exploded partial perspective view showing construction of the lightweight woven polyester glass protective layer as rigidly formed with a resin-catalyst mixture.

Referring now to FIG. 10 of the drawings, the woven multilayer polyester glass material is shown in an exploded partial perspective view illustrating the numerous layers and method for manufacturing in a rigid assembly using a resin-catalyst mixture. In the description of FIG. 10, a typical method of making the rigid woven polyester glass protective layer is described. A tray 116 is shown with an upwardly flared outer edge 118 to retain the resin-catalyst mixture therein. Two layers 120 of woven polyester glass are laid inside of tray 116. A nonwax resin-catalyst mixture is spread uniformly over two sheets of woven polyester glass. Next, four layers of woven polyester glass sheets 112 are applied on top of the first two layers 120. The resin-catalyst mixture is applied upon the four layers. Next, as an optional feature that increases the bullet-resistant strength of the rigidly formed woven polyester glass protective layer is a sheet of woven steel 124 as will be explained in more detail subsequently. The woven steel 124 stops short of the edges of the layers of the woven polyester glass sheets to allow bonding with subsequent layers around the outer edges. Next, four more layers of the woven polyester glass sheet 126 are placed on top of the woven steel 124, which layers 126 extend beyond the edges of the woven steel 124 to bond with the edges of the four layers of polyester glass sheet 122. Again, the resin-catalyst mixture is uniformly applied to the four layers of polyester glass sheet 126. Again, four layers of woven polyester glass sheet are placed on top of the layers and a resin-catalyst mixture applied thereto. Finally, the last four layers of woven polyester glass sheet 130 are placed on top of the four preceding layers 128.

All of the polyester glass sheet layers 120, 122, 124, 126, 128 and 130 are inserted inside of a machine with tray 116 wherein the layers of polyester glass sheet and resin-catalyst mixture are heated and compressed to form a rigid woven polyester glass protective layer. To prevent sticking either to the tray 116 or to the machine, it may be necessary to have an upper and lower layer of plastic enclosing the various layers of woven polyester glass, woven steel and resin-catalyst mixture. Pressure and heat are applied to cause a uniform distribution of the resin-catalyst throughout the materials. As the mixture hardens, a rigid woven polyester glass protective panel is formed.

Figure 11:
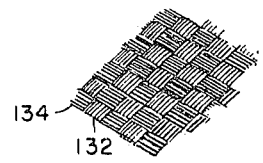
FIG. 11 is an enlarged partial perspective view illustrating weave of a single sheet of the lightweight woven polyester glass protective layer.

Referring now to FIG. 11, an enlarged partial sectional view of the woven polyester glass material is shown. A first plurality of strands of polyester glass forms a first ribbon 132 that extends in a first direction. A second plurality of strands of polyester glass forms a second ribbon 134 that extends in a second direction perpendicular to the first ribbon 132. By interweaving a plurality of first and second ribbons 132 and 134 as shown in FIG. 11, a sheet of flat, flexible polyester glass material is formed.

Figure 12:
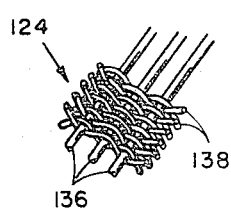
FIG. 12 is an enlarged partial perspective view of the woven steel embedded in the rigidly formed woven polyester glass protective layer.

Referring now to FIG. 12, the woven steel 124 is shown wherein large steel wires 136 extend parallel in a first plane. Smaller guage steel wires 138 are interwoven in the same plane about the large steel wires 136 to form a woven steel screen. A typical example of such woven steel 124 is manufactured by Sherwatt Wire Cloth Company, Inc. and called Plain Steel Carbon Wire Cloth, 24 by 110 mesh. The woven steel 124 is an optional feature that may or may not be included within the rigidly formed woven polyester glass protective panel. The steel screen 124 helps disperse and fragmentize a projectile so that its impact will be spread over a larger area thereby considerably increasing the stopping power of the woven polyester glass material 140 shown in FIG. 10 upon rigidly forming as described hereinabove.

Two additional types of materials are used in the armoring of the automobile 20. One is a common ballistic nylon and the other is a ballistic aromatic polyamide material sold under the trademark Kevlar. The various layers are cut and stacked one upon the other, and sewn together as shown in the pictorial view of FIG. 14. Assume in FIG. 14 the material being sewn together is ballistic nylon 142. The outer edge of the ballistic nylon 142 is sewn together by stitching 144 around its outer perimeter. Next, cross-stitching is periodically spaced along the sheet of multi-layer ballistic nylon 142. Longitudinal stitching 148 is sewn in the ballistic nylon 142 perpendicular to the cross-stitching 146. Finally, patterns are marked on the sheet of ballistic nylon 142 to be used in the armor of the automobile 20. The patterns are then cut and the industrial sewing machine 150 is used to sew the outer perimeter of the various patterns. In the sewing of the ballistic nylon 142, as well as the aromatic polyamide material, the stitch spacing and the tightness of the stitch has to be fairly accurately controlled to obtain the optimum tightness and spacing. By obtaining the optimum tightness and spacing in the stitches the resistance to projectiles therethrough is increased. For the ballistic nylon, the optimum spacing between stitches varies between a range of ⅛ inch to ¼ inch apart. The tightness of the stitching should be between a medium-to-firm tightness. The stitching should be repetitive in cross stitched squared between 4 to 6 inches per side.

The aromatic polyamide material is formed into multiple layers basically the same as the ballistic nylon. However, the spacing between stitches of the aromatic polyamide material for optimum strength should be between ⅛ and ¼ inch. The tightness of the stitching should be between a medium-to-firm tightness. The stitching should be repetitive in cross stitched squares between 4 to 6 inches per side.

The ballistic nylon, which is bulkier than the aromatic polyamide material, is normally used in the floorboard or floor panel 24 and in the top 24 as part of the headliner where space is not as critical. In the doors of the automobile 20 or in the kick panels, the aromatic polyamide material is used normally in combination with woven rigid polyester glass protective panel. For additional strength around the edges, pop rivets may be inserted through the entire protective sheet 158, especially around the outer edges thereof, and periodically throughout the center portion.

Since the aromatic polyamide material deteriorates if it comes in contact with moisture, the entire protective sheet 158 is encapsulated in a water resistant material, such as a thin layer of plastic. Assume that a bullet is fired into the side of automobile 20 so that it strikes the protective sheet 158 approximately perpendicular to surface 160. The woven rigid polyester glass protective panel 152 would tend to flatten and disperse the projectile with the 24-ply aromatic polyamide material 154 catching any remaining fragments or portions of the projectile.

The reinforced framing, ballistic windows, woven polyester glass sheets and ballistic cloth in the retrofitted automobile overlap. "Overlap" refers to the fact that the relationship of the above elements is contiguous such that a projectile must pass through one of them to penetrate the passenger compartment.

Referring to FIGS. 15 and 16 in combination, a tear gas distribution system located behind the reflectors 46 of the automobile 20 shown in FIG. 1 is shown in more detail. A tear gas cannister 162 has a powdered tear gas substance 168 contained in the main chamber thereof. The firing portion 170 of the tear gas cannister 162 has a female electrical plug 172 which connects to an electrical match 174 which creates an arc thereacross. Firing cap 176, which may consist of black powder, is ignited thereby driving the piston 178 in the direction indicated by the arrows. The piston rod 180 forces the pop cap 182 off the end 184 of the cannister 162. Also, the reflector 46 shown in FIG. 1 is blown off the side of the vehicle 20. The movement of the piston towards end 184 disperses the powdered tear gas substance 168 outwardly from the armored vehicle 20.

To secure the tear gas cannister 162 in position, it is contained in a tear gas cannister housing 164 which has a flat plate 186 with an opening 188, that coincides with opening 190 of the fender of the automobile 20. The flat plate 186 is secured to the fender 192 of the automobile 20 by means of rivets 194 extending through holes 197 of the flat plate 186. The rivets 194 are hidden behind the reflectors 46. The tear gas cannister 162 is secured in position by means of an open ended cylinder 196 secured to the flat plate 186 by any suitable means, such as welding. Also, bolt 198 extends across the open ended cylinder 196, offset from the center thereof, in a close abutting relationship with the end shoulder 200 of the tear gas cannister 162. The bolt 198 is secured in position by wing nut 202. Internal well 193 provides additional support for the rear portion of the housing 164 which is received inside of opening 195 in a close fit relationship.

By an electrical connection from the female plug 172 to the control panel of the automobile 20, the tear gas cannister 162 can be fired thereby dispensing the powdered tear gas substance 168 out the openings 188 and 190 for dispersal radially from the automobile 20. Any number of tear gas cannisters could be contained on an automobile with different order of firing, but in this preferred embodiment, it is envisioned that one tear gas cannister would be contained in each fender and that diagonally opposing tear gas cannisters would be simultaneously fired.

Figure 18:
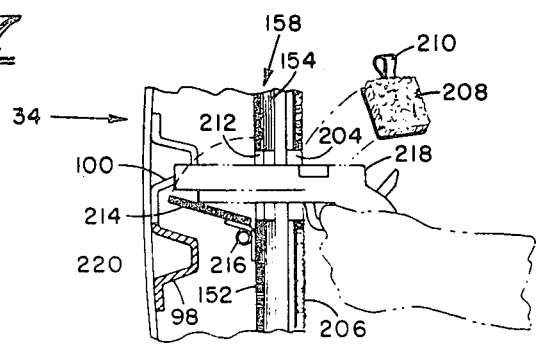
FIG. 18 is a partial elevated sectional view of the door illustrating use of gun ports.

Previously in the description of FIG. 8, a cutout portion 100 of cross brace 98 was described for front door 34. The cutout portion allows a gun port to be installed. The gun port shown in FIG. 18 has an opening 204 in the interior panel 206 normally covered by covering block 208 that may be easily removed by tab 210. Another hole 212 adjacent to hole 204 is cut in the protective shield 158 that includes the aromatic polyamide material 154 and the rigid woven polyester glass protective panel 152. A protective flap 214 formed from multiply woven rigid polyester glass protective panel is pivotedly mounted on the protective shield 158 by a spring-loaded hinge 216.

By a quick removal of the covering block 308 by tap 210, gun 218 can be inserted through openings 204 and 212 thereby pushing the protective flap 124 out of the way and subsequently fired through the outer skin 220 of the door 34. The skin 220 will not substantially interfere with the projectile path of a bullet from a normal hand gun in a close attack situation.

Figure 17:
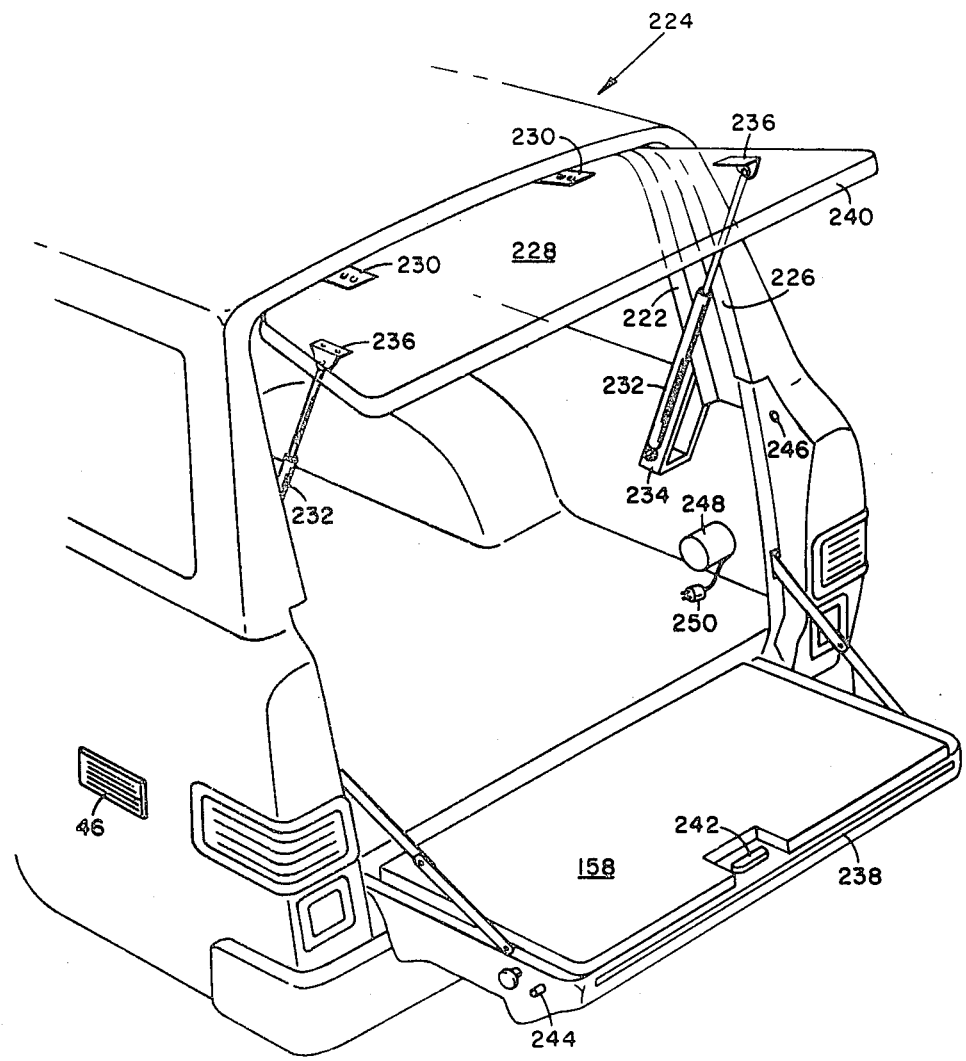
FIG. 17 is a partial perspective view indicating the installation of armor in the rear of an automobile, such as a Jeep Wagoner.

Referring now to FIG. 17, the method of securing armor for the rear portion of a vehicle, such as a Jeep Wagoner or International Scout, is shown. In prior designs, considerable problems have occurred in creating a good seal between the rear window and the frame of the automobile. In the present design, it is envisioned that the seal of the automobile will not be distributed with all armor being contained inside thereof. An additional frame 222 for the vehicle 224 is mounted adjacent to the normal frame opening 226. A Lexgard laminate is pivotally mounted inside of frame 222 by means of hinges 230 so that it will open outward through normal frame opening 226. Springloaded cylinders 232 are attached by special bracket supports 234 and by a mounting plate 236 to aid in the opening of the protective Lexgard laminate 228. The lower edge 240 of the Lexgard laminate 228 extends below the upper portion of the tailgate 238, which has a retractable rear window. The tailgate 238 is protected by a protective sheet 158 mounted thereto. Further, to prevent an individual from breaking the rear window and opening the tailgate 238 by means of handle 242, deadbolt locks 244 are electrically operated by solenoids to extend into holes 246.

The tear gas cannister 162 can be seen as mounted inside of decorative cover 248, which covers the tear gas cannister 262 and tear gas cannister housing 264. For illustrative purposes, the electrical connection 250 thereto is shown outside the decorative cover 248.

The vehicle 222 contains normal protective armor as previously described in conjunction with automobile 20, such as multiple-ply ballistic nylon in the floor and headliner, Lexgard laminate in the side windows, and protective sheets 158 in the side panels. Wheel wells may be protected by any of a number of ways, such as multi-layers of ballistic nylon, aromatic polyamide material, and/or rigid woven polyester glass protective panel.

"Ballistic shield" as used herein refers to any of a number of ballistic materials which are designed, constructed and placed to secure the passenger compartment of the subject vehicle from penetration by high velocity projectiles.

The above described principles can also be used to install lightweight armor in new automobiles. Instead of rebuilding the frames of the windows for the thicker glass, the automobile as originally manufactured could receive the thicker polycarbon laminate or Lexgard laminate with either the safety plate or bullet-resistant glass. As originally assembled, the multi-layer ballistic nylon or aromatic polyamide material could be installed with the rigid woven polyester glass protective panel to provide from the factory a lightweight armored vehicle. Optional features such as the tear gas dispersal system could be part of the original automobile, thereby not requiring retrofitting.

While the invention has been described in connection with the preferred embodiment, it is not intended to limit the invention to the particular forms set forth, but, on the contrary, it is intended to cover such alternatives, modifications, and equivalents as may be included within the spirit and scope of the invention as defined by the appended claims.

I claim:

1. A protective layer designed and constructed to dissipate at least a portion of the kinetic energy of a high velocity projectile comprising:
   a plurality of woven ballistic sheets comprised of ballistic strands;
   a sizing material and a bonding material which imperfectly bond with each other;
   said sizing material applied to said plurality of sheets;
   said plurality of sized sheets being layered next to each other and bound into a protective layer by said bonding material;
   said protective layer being effective to dissipate at least a portion of the kinetic energy of a high velocity projectile impacting upon said protective layer;
   said size sheets are laminated together by said bonding material;
   said laminated sized sheets are designed and constructed to delaminate when impacted by a high velocity projectile;
   said delamination is effective to dissipate a portion of the kinetic energy of said projectile;
   said sheets contain at least some hard filaments to dissipate at least a portion of the kinetic energy of said high velocity projectile by deforming said projectile;
   said sheets containing at least some filaments of high tensile strength to dissipate at least a portion of the kinetic energy of said high velocity projectile by causing the formation of said sheet to penetration by said projectile; and
   said strands are comprised of a mixture of polyester filaments and glass filaments.

2. The protective layer of claim 1 wherein said strands are comprised of from 18 to 28 filaments each.

3. The protective layer of claim 2 wherein said sheets are comprised of a 24 ounce, four times four weave of woven roven polyester and glass filaments.

4. The method of making a lightweight woven protective layer for dissipating at least a portion of the kinetic energy of a high velocity projectile comprising:
   spinning hard filaments and filaments of high tensile strength into strands containing both said hard filaments and said filaments of high tensile strength;
   weaving said ballistic sheets from said strands;
   sizing a plurality of said woven ballistic sheets with a sizing material;
   laminating a first sheet upon a second sheet with a resin catalyst mixture, said resin catalyst mixture imperfectly bonding with said sizing material;
   repeating the laminating step with additional sheets subsequently being located upon said second sheet until the desired number of sheets have been laminated upon each other to form a stack of laminated sheets; and subjecting said stack to heat and pressures to fuse said stack into a rigid protective layer;

said filaments are comprised of a mixture of polyester filaments and glass filaments.

5. The method of claim 4 wherein said strands are comprised of from 18 to 28 filaments each.

6. The method of claim 5 wherein said strands are woven into ballistic sheets comprising a 24 ounce, four times four weave of woven roven polyester and glass filaments.

7. The method of claim 4 further including weaving a sheet of woven steel and placing said woven steel sheet within said protective layer to disperse said projectile.

8. A protective layer designed and constructed to dissipate at least a portion of the kinetic energy of a high velocity projectile comprising:

a plurality of woven ballistic sheets comprised of ballistic strands, each of said sheets containing both hard filaments to dissipate at least a portion of the kinetic energy of a high velocity projectile by deforming said projectile and filaments of high tensile strength to dissipate at least a portion of the kinetic energy of a high velocity projectile by causing deformation of said sheet prior to penetration by said projectile;

a sizing material applied to said plurality of sheets;

said plurality of sized sheets being layered next to each other and bound into a protective layer by a bonding material;

said protective layer being effective to dissipate at least a portion of the kinetic energy of a high velocity projectile impacting upon said protective layer;

at least some of said ballistic strands containing both said hard filaments and said high tensile strength filaments; and said strands are comprised of a mixture of polyester filaments and glass filaments.

9. The protective layer of claim 8 wherein said strands are comprised of from 18 to 28 filaments each.

10. The protective layer of claim 9 wherein said sheets are comprised of a 24 ounce, four times four weave of woven roven polyester and glass filaments.

11. The protective layer of claim 10 further including a sheet of woven steel located within said protective layer to disperse said projectile.

12. A method of retrofitting a standard automobile for lightweight armor consisting of the following steps:

removing interior furnishing and windows from a passenger compartment of said automobile;

taking window operating mechanisms out of said automobile;

reframing windows and doors to receive bullet resistant windows therein;

contouring said automobile adjacent said reframed windows for said reframed windows;

inserting a rigid protective layer formed from a plurality of sized woven ballistic sheets laminated next to each other in doors and walls of said passenger compartment;

installing ballistic resistant cloth in floors and ceiling of said passenger compartment;

reinforcing frames of said passenger compartment;

refurbishing said interior furnishing of said passenger compartment; said ballistic sheets being comprised of ballistic filaments, at least some of said filaments being hard filaments to dissipate at least a portion of the kinetic energy of a high velocity projectile by deforming said projectile and at least some of said filaments being filaments of high tensile strength to dissipate at least a portion of the kinetic energy of a high velocity projectile by causing deformation of said sheet prior to penetration by said projectile;

said reinforced framing, bullet resistant windows, rigid protective layer and ballistic resistant cloth creating overlapping barriers to penetration of said passenger compartment by most projectiles in event of attack with a minimum increase in weight.

13. The method as described in claim 12 including a step of adding a tear gas dispersal system by tear gas cannisters with electrical firing caps mounted adjacent to openings in verticle walls of said automobile, switch means from a battery to said tear gas cannister causing tear gas to be dispersed radially through said openings upon closure of said switch means.

14. The method as described in claim 13 including steps of wrapping a fuel tank of said automobile in said ballistic resistant cloth and encasing said battery in said rigid protective layer.

15. The method as given in claim 12 including additional steps of forming said rigidly protective layer from sheets of woven polyester glass material embedded in a resin-catalyst mixture uniformly distributed under pressure and heat, cutting pieces of said rigidly woven polyester glass to match locations for said inserting in said doors and walls.

16. The method as given in claim 15 including an additional step of sewing said ballistic resistant cloth in multiple layers and cutting to match locations for said inserting and said installing, at least some of said ballistic resistant cloth being protected from moisture by an impermeable outer layer.

17. The method as given in claim 16 including attaching said ballistic resistant cloth by a silicone bonding means, said ballistic resistant cloth including ballistic nylon and aromatic polyamide material.

* * * * *

UNITED STATES PATENT AND TRADEMARK OFFICE
CERTIFICATE OF CORRECTION

PATENT NO. : 4,352,316
DATED : October 5, 1982
INVENTOR(S) : Richard C. Medlin

It is certified that error appears in the above-identified patent and that said Letters Patent is hereby corrected as shown below:

Claim 1, (Column 12, line 43) delete "formation" and insert
-- deformation --.

*Signed and Sealed this*

*First* Day of *February 1983*

[SEAL]

*Attest:*

GERALD J. MOSSINGHOFF

*Attesting Officer*  *Commissioner of Patents and Trademarks*